Figure 1:
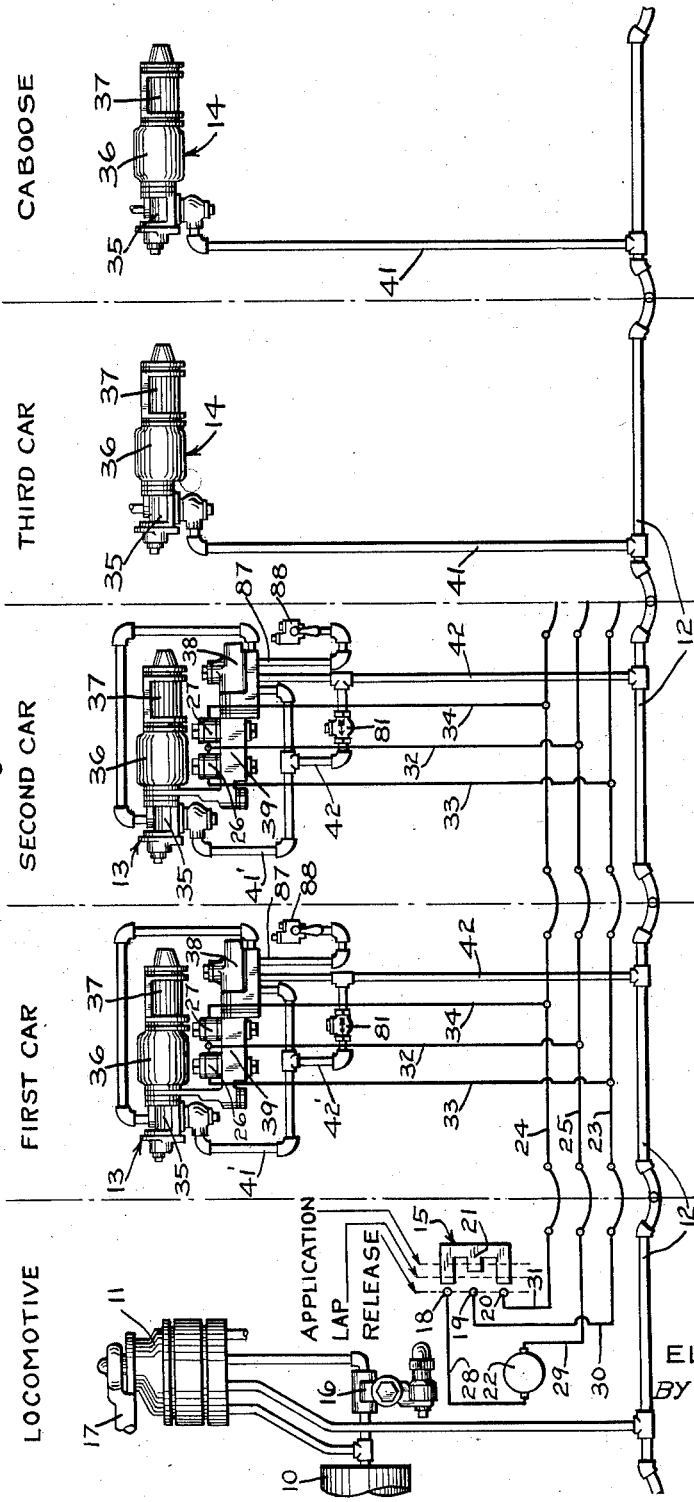

July 24, 1934.  E. E. HEWITT  1,967,308
ELECTROPNEUMATIC BRAKE
Filed Feb. 17, 1932  2 Sheets-Sheet 1

INVENTOR.
ELLIS E. HEWITT
BY Wm. M. Cady
ATTORNEY.

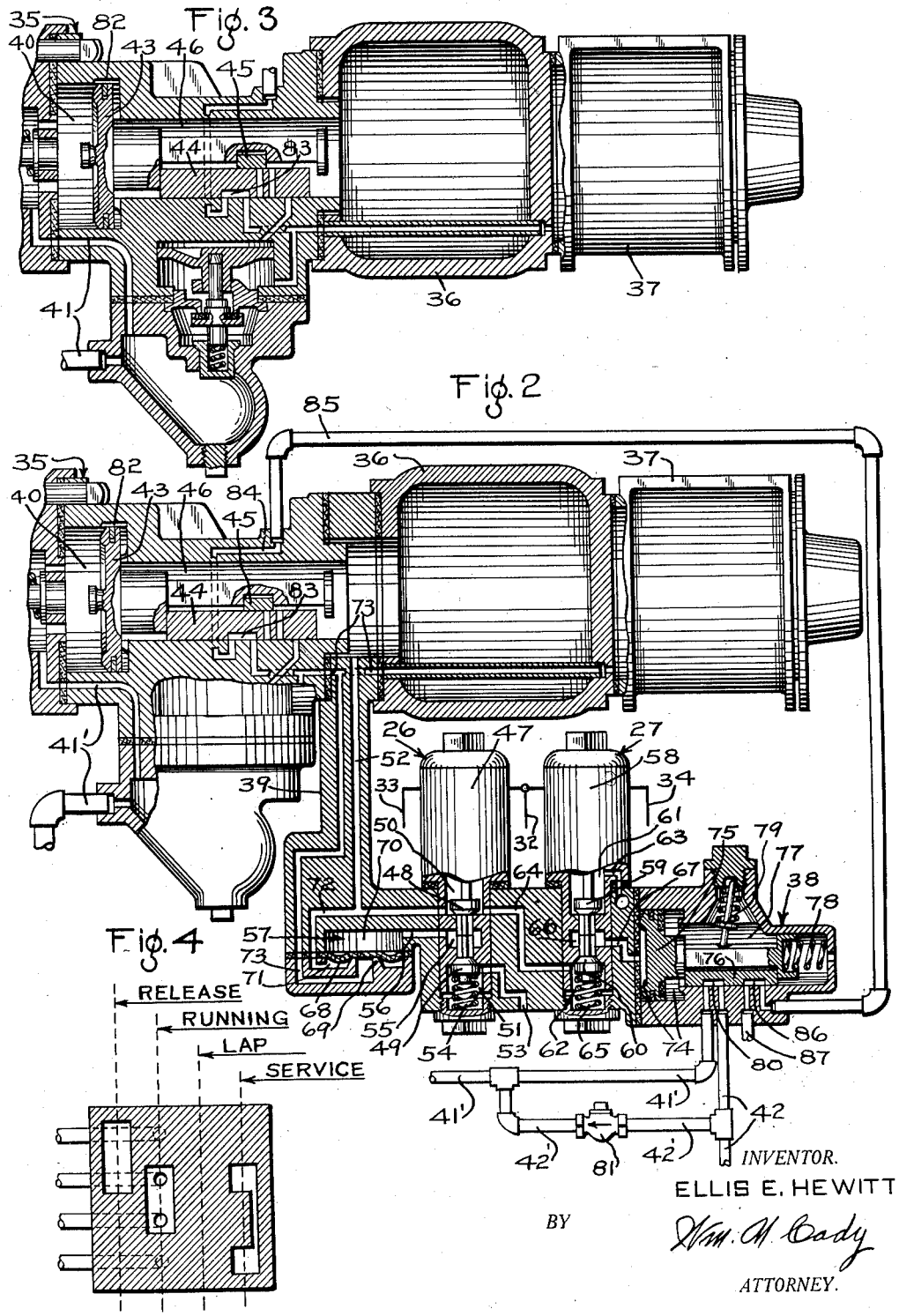

Patented July 24, 1934

1,967,308

UNITED STATES PATENT OFFICE 1,967,308

ELECTROPNEUMATIC BRAKE

Ellis E. Hewitt, Edgewood, Pa., assignor to The Westinghouse Air Brake Company, Wilmerding, Pa., a corporation of Pennsylvania Application February 17, 1932, Serial No. 593,582

6 Claims. (Cl. 303—15)

This invention relates to railway brakes, and more particularly to an electro-pneumatic brake equipment.

In the process of installing electro-pneumatic brake equipments on railway cars, there will necessarily be a transition period, in which some cars are equipped with purely pneumatic brake equipments and other cars with electro-pneumatic brake equipments, so that trains will be made up of cars having mixed equipments. It is, therefore, highly desirable that means be provided which will be effective to cause the brakes to be applied and released on cars, whether equipped with either electro-pneumatic or purely pneumatic equipment.

One object of my invention is to provide a brake system in which the brakes can be applied and released on all of the cars of the train, regardless of whether a car is equipped with an electro-pneumatic or a purely pneumatic brake equipment.

A more specific object of my invention is to provide means whereby the operation of the electro-pneumatic brake equipment is effective to cause a reduction in brake pipe pressure, and thereby the operation of the purely pneumatic brake on cars of the train so equipped.

Another object of my invention is to provide means for rendering the purely pneumatic equipment inoperative on cars equipped with an electro-pneumatic brake apparatus, when the electro-pneumatic brake apparatus is operated to effect an application of the brakes.

Other objects and advantages will appear in the following more detailed description of the invention.

In the accompanying drawings: Fig. 1 is a diagrammatic view of a fluid pressure brake system, embodying my invention, and showing equipment for a locomotive, three cars and a caboose, the equipment on the first two cars being of the electro-pneumatic type and the third car and caboose having a purely pneumatic type of equipment; Fig. 2 is a view, mainly in section, of the fluid pressure brake equipment of the electro-pneumatic type; Fig. 3 is a view, mainly in section, of the fluid pressure brake equipment of the purely pneumatic type; Fig. 4 is a development view of the brake valve device shown on the locomotive in Fig. 1, illustrating the connections effected in its several operating positions.

The equipment shown in the accompanying drawings includes a locomotive brake equipment, which may comprise a main reservoir 10, a brake valve device 11 having the usual operating handle 17, a brake pipe 12, a feed valve device 16, and a brake switch device 15 which is adapted to be operated to effect electrical control of the brakes.

The brake switch device 15 may comprise fixed terminal contacts 18, 19 and 20, and a movable contact drum 21 adapted to be moved into and out of contact with the terminal contacts to control the electric operation of the electro-pneumatic brake apparatus in a manner to be hereinafter more specifically described.

A direct current generator 22, has one terminal wire 28 connected to the switch contact 18, and a plurality of train wires 23, 24 and 25, which wires are connected respectively to the switch contacts 19 and 20 and to the other terminal of the generator 22, through wire 29, will hereinafter be respectively referred to as application, release and return wires, the train wires 23 and 24 being respectively connected to magnets 26 and 27 of the electro-pneumatic brake equipment on the cars, which will be later described in detail. One terminal of each of the magnets 26 and 27 is connected by a wire 32 to the return wire 25.

The purely pneumatic equipment on each car may comprise a triple valve device 35, an auxiliary reservoir 36, and a brake cylinder 37.

In addition to the magnet devices 26 and 27, the electro-pneumatic brake apparatus includes a valve device 38 carried by a pipe bracket 39, which is secured between the triple valve device 35 and the auxiliary reservoir 36.

The triple valve device on each car may be of the usual type comprising a casing having a chamber 40 connected directly to the brake pipe through passage and pipe 41 in the case of cars equipped only with a purely pneumatic brake equipment, and to passage and pipe 41', controlled by the valve device 38, in the case of cars equipped with the electro-pneumatic brake apparatus. Chamber 40 contains a piston 43 adapted to operate a main slide valve 44 and a graduating slide valve 45 contained in a chamber 46 connected to the auxiliary reservoir 36.

The application magnet valve device 26 may comprise a magnet 47 adapted to control oppositely seating valves 48 and 49 contained in chambers 50 and 51 respectively, the chamber 50 being connected with the auxiliary reservoir 36 through a passage 52 and the chamber 51 being open to the atmosphere through passage 53. A coil spring 54, contained in the chamber 51, normally retains the valve 49 seated and the valve 48 unseated. A chamber 55, lying intermediate the valves 48 and 49, is connected through a passage 56 to chamber 70 of an application valve device 57.

The release magnet valve device 27 may comprise a magnet 58 adapted to control oppositely seating valves 59 and 60 contained in chambers 61 and 62 respectively, the chamber 61 being open to the atmosphere through passage 63 and the chamber 62 being connected to the valve chamber 50 of the application magnet valve device 26 through a passage 64. A coil spring 65 contained in the chamber 62 normally retains the valve 60 seated and the valve 59 unseated. A chamber 66 lying intermediate the valves 59 and 60 is connected through a passage 67 to piston chamber 74 of the release valve device 38.

The application valve device 57 may comprise a flexible diaphragm valve 68, which is mounted in the bracket 39 and is adapted to seat on an annular seat rib 69. A chamber 70 on one side of the diaphragm valve is connected to the chamber 55 through the passage 56, and a chamber 71 at the other side of the diaphragm 68 is open to a passage 72 which joins the passage 52. Leading from the inner seated area of the diaphragm valve is a passage 73 leading to the brake cylinder 37.

The release valve device 38 may comprise a casing having a piston chamber 74 connected to the passage 67 leading to the chamber 66 of the release magnet valve device 27. A chamber 74 contains a piston 75 adapted to operate a slide valve 76 contained in a chamber 77. A coil spring 78, contained within the casing, serves to normally retain the slide valve 76 in its release position (as shown in Fig. 2 of the drawings). A spring urged pin 79 acting upon the slide valve 76 serves as a resilient means to keep the valve seated.

Assuming that the locomotive, cars, and caboose are operatively connected as indicated diagrammatically in Fig. 1 of the drawings, the operator may manipulate the handle 17 of the brake valve device 11 and cause fluid under pressure to be supplied to the brake pipe 12 in the usual manner. The fluid thus supplied to the brake pipe flows through pipe and passage 41 directly to the piston chamber 40 of the triple valve devices on cars equipped only with purely pneumatic brake apparatus, and through pipe 42, cavity 80 in slide valve 76, and pipe 41' as well as through a branch pipe 42', past a check valve 81, and pipe 41' to the chamber 40 of the triple valve devices on cars also equipped with electro-pneumatic brake apparatus, and with the triple valve devices in release position, as shown in Figs. 2 and 3, fluid under pressure flows from the chamber 40 of each triple valve device to the auxiliary reservoir 36 through the usual feed groove 82, around the piston 43 and through the valve chamber 46.

On cars equipped with the electro-pneumatic brake apparatus, fluid under pressure supplied to the auxiliary reservoir 36 flows to both sides of the diaphragm 68 of the application valve device 57, to the lower face through passages 52 and 72 and to the chamber 70 at the upper face through passage 52, chamber 50, past the open valve 48, chamber 55 and passage 56. Fluid under pressure also flows from chamber 50 of the application magnet valve device 26 to chamber 62 of the release magnet valve device 27 through passage 64. With the triple valve device in release position, the brake cylinder passage 73, which leads from the inner seated area of the flexible diaphragm valve 68, is connected to the atmosphere through a cavity 83 in the main slide valve 44 of the triple valve device, passage 84, pipe 85, through cavity 86 in the slide valve 76, to release pipe 87 which may be provided with the usual retaining valve device 88. Since the inner seated area of the diaphragm 68 is thus connected to the atmosphere, as just described, the pressure of fluid in the chamber 70 will maintain the diaphragm valve 68 seated on the seat rib 69 against the opposing pressure on the lower face of the diaphragm, so that there will be no loss of fluid past this valve from the auxiliary reservoir 36 to the atmosphere. The condition just described is made possible by the fact that the valve 59 of the release magnet valve device 27 is unseated so that piston chamber 74 is vented to exhaust port 63, and hence the coil spring 78 will cause the piston 75 and slide valve 76 to be moved to the position shown in Fig. 2 of the drawings.

If it is desired to effect an application of the brakes, with the equipment charged in the manner just described, through the medium of the electro-pneumatic brake apparatus, the brake valve device 11 should first be moved to lap position and then the brake switch is moved to application position, in which the switch drum 21 contacts with the contact terminals 18, 19 and 20, thus connecting one terminal of the direct current generator 22 to both the application train wire 23 and the release train wire 24. With these connections made, the magnet 47 of the application valve device 26, and the magnet 58 of the release valve device 27 are both energized and respectively effect the seating of valves 48 and 59. The seating of valves 48 and 59 respectively effects the unseating of valves 49 and 60 against the respective pressures of coil springs 54 and 65. The seating of valve 48 cuts off communication between the auxiliary reservoir 36 and the chamber 70 of the application valve device 57 and by reason of the fact that the valve 49 is unseated, the chamber 70 is vented to the atmosphere through passage 56, chamber 55, past the valve 49 and passage 53. With the chamber 70 thus vented, fluid under pressure from the auxiliary reservoir 36, acting on the under face of the diaphragm 68, causes the same to be flexed upwardly to unseat it from the seat ring 69 and permits fluid from the auxiliary reservoir to flow through passage 73 to the brake cylinder 37. With the valve 60 unseated in the manner previously described, fluid under pressure flows from the auxiliary reservoir 36 through passage 52, chamber 50, passage 64, past the valve 60, through chamber 66 and passage 67 to the piston chamber 74 of the release valve device 38. Fluid from the auxiliary reservoir, thus supplied to the piston chamber 74, causes the piston 75 to be moved to the right against the pressure of the spring 78 to cause the slide valve 76 to be shifted into lap position, wherein communication between pipes 85 and 87 by way of the cavity 86 in the slide valve 76 is cut off, so that the release of fluid from the brake cylinder is prevented.

In order to limit the degree of brake cylinder pressure in effecting an application of the brakes, the operator, after moving the brake switch device 15 to application position in the manner previously described, moves the brake switch device to lap position, as soon as the desired brake cylinder pressure has been obtained. In lap position, the electrical circuit through the magnet 47 of the application magnet valve device 26 is opened, while maintaining the magnet 58 of the release magnet valve device 27 energized. The deenergization of the magnet 47 permits the valve 49 to be seated under the action of the coil spring 65 and at the same time the valve 49 will be unseated. In this manner, communication between the chamber 70 and the atmosphere is cut off and the chamber 70 is placed in open communication with the auxiliary reservoir 36, so that the chamber 70 again becomes charged with fluid under auxiliary reservoir pressure, which causes the diaphragm 68 to be flexed downwardly into seating engagement with the seat ring 69 to cut off further supply of fluid from the auxiliary reservoir 36 to the brake cylinder 37.

To effect an electric release of the brakes, the operator moves the brake switch device 15 to release position, thus opening the magnet circuits through both the application magnet valve device 26 and the release magnet valve device 27, which results in the deenergization of the magnets 47 and 58. With the magnets 47 and 58 of each electro-pneumatic brake apparatus deenergized, the diaphragm 68 of the application valve device 57 will be seated to cut off the flow of fluid under pressure from the auxiliary reservoir 36 to the brake cylinder 37 in the manner previously described. With the magnet 58 of each electro-pneumatic brake apparatus 13 deenergized, the spring 65 will move the valve 60 to its seat and the valve 59 will be unseated. The seating of the valve 60 cuts off communication between the chambers 62 and 66 and thus cuts off the supply of fluid from the auxiliary reservoir to the piston chamber 74 of the release valve device 38. The unseating of the valve 59 establishes communication between chambers 66 and 61 and thus permits the venting of fluid under pressure from the piston chamber 74 to the atmosphere through passage 67, chamber 66, past valve 59, through chamber 61 and passage 63. When the piston chamber 74 is vented to the atmosphere, the coil spring 78 moves the piston 75 and slide valve 76 to the left to establish a connection between pipes 85 and 87 through the cavity 86 formed in the slide valve 76. With this connection established fluid under pressure is exhausted from the brake cylinder through passage 73, cavity 83 in the main slide valve 44 of the triple valve device 35, passage 84, pipe 85, cavity 86, and release pipe 87 to effect a release of the brakes.

When an electric application of the brakes is effected in the manner previously described it will result in the automatic operation of the purely pneumatic triple valve devices on cars equipped only with pneumatic brake apparatus. This will be accomplished due to the reduction in brake pipe pressure resulting from the electric operation of the electro-pneumatic brake apparatus.

When an electro-pneumatic brake application is effected, the auxiliary reservoir pressure is reduced by flow to the brake cylinder, and the triple valve piston 43 on cars equipped with the electro-pneumatic brake apparatus, remaining in release position fluid will flow from the piston chamber 40 through the feed groove 82 to the valve chamber 46 and the auxiliary reservoir, and consequently fluid under pressure will be vented from the brake pipe 12 by flow through the pipe 42, pipe 42', past the check valve 81 and through pipe 41' to piston chamber 40.

The reduction in brake pipe pressure thus produced on cars equipped with the electro-pneumatic brake apparatus, will be sufficient to cause the operation of the triple valve devices on cars equipped only with pneumatic brake apparatus, so as to effect a pneumatic application of the brakes on cars so equipped.

It will be noted that neither the triple valve piston 40 nor the slide valves 44 and 45 of the triple valve devices on cars equipped with the electro-pneumatic brake apparatus, are moved upon an electro-pneumatic application of the brakes.

This is due not only to the fact that the auxiliary reservoir pressure is being reduced on the valve chamber side of the triple valve piston 43, but also because the release slide valve 76 is moved in an electro-pneumatic brake application, so as to cut off communication from pipe 41' to pipe 42' and the brake pipe 12, and since fluid cannot be vented from the piston chamber 40 by way of the by-pass pipe 42', by reason of the check valve 81, it will be seen that any reduction in brake pipe pressure, due to leakage or otherwise, will not be transmitted to the piston chamber 40.

If, for any reason, such as failure or inoperativeness of the electro-pneumatic brake apparatus, it is desired to effect an application of the brakes pneumatically, this may be done by moving the brake valve handle 17 of the brake valve device 11 to service application position, in which a reduction in brake pipe pressure is effected in the usual well known manner.

When the brake pipe pressure is thus reduced and the electro-pneumatic brake apparatus remains inactive, the triple valve devices on cars equipped with the electro-pneumatic brake apparatus as well as the triple valve devices on cars equipped only with pneumatic brake apparatus, are operated in the usual manner to effect an application of the brakes. In this case, a reduction in fluid pressure in the piston chamber 40 of the triple valve devices on cars equipped with the electro-pneumatic brake apparatus, is effected through pipe 41', cavity 80 in the release slide valve 76, and pipe 42.

From the foregoing, it will be evident that with my invention, when some cars of the train are equipped with an electro-pneumatic brake apparatus, and other cars only with a purely pneumatic brake apparatus, the brakes may be applied and released on all the cars of the train when an electro-pneumatic brake application is effected. Furthermore, it will be seen that means have been provided to prevent the pneumatic operation of the electro-pneumatic brake apparatus upon a reduction in brake pipe pressure resulting from leakage or from the electric operation of said apparatus.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. The combination with a brake pipe, an auxiliary reservoir, a brake cylinder, and a brake controlling valve device operated upon a reduction in brake pipe pressure for supplying fluid from the auxiliary reservoir to the brake cylinder, of an electro-pneumatic brake apparatus operative electrically to supply fluid from the auxiliary reservoir to the brake cylinder, means controlling a communication from said brake controlling valve device to the brake pipe and operative upon operation of said electro-pneumatic brake apparatus to apply the brakes, to cut off said communication.

2. The combination with a brake pipe, an auxiliary reservoir, a brake cylinder, and a brake controlling valve device operated upon a reduction in brake pipe pressure for supplying fluid from the auxiliary reservoir to the brake cylinder, of an electro-pneumatic brake apparatus operative electrically to supply fluid from the auxiliary reservoir to the brake cylinder, a fluid pressure operated valve device controlling a communication through which fluid is vented from said brake controlling valve device to the brake pipe, and a magnet valve device operated to supply fluid under pressure to operate said valve device to cut off said communication concurrently with the operation of said electro-pneumatic brake apparatus to supply fluid from the auxiliary reservoir to the brake cylinder.

3. The combination with a brake pipe, an auxiliary reservoir, a brake cylinder, and a triple valve device operated upon a reduction in brake pipe pressure for supplying fluid from the auxiliary reservoir to the brake cylinder, of a magnet valve device operated electrically to supply fluid from the auxiliary reservoir to the brake cylinder, a valve mechanism controlling communication through which fluid is vented from said triple valve device to the brake pipe, and a magnet valve device operated electrically for effecting the operation of said valve mechanism to cut off said communication concurrently with the operation of said first mentioned magnet valve device to supply fluid from the auxiliary reservoir to the brake cylinder.

4. The combination with a brake pipe, an auxiliary reservoir, a brake cylinder, and a triple valve device operated upon a reduction in brake pipe pressure for supplying fluid from the auxiliary reservoir to the brake cylinder, of a magnet valve device operated electrically to supply fluid from the auxiliary reservoir to the brake cylinder, a valve mechanism controlling a communication through which fluid is vented from said triple valve device to the brake pipe and another communication through which fluid is vented from the brake cylinder, and a magnet valve device operated electrically for effecting the operation of said valve mechanism to close said communications.

5. The combination with a brake pipe, an auxiliary reservoir, a brake cylinder, and a triple valve device having a piston subject to the opposing pressures of the brake pipe and auxiliary reservoir and operated upon a reduction in brake pipe pressure for supplying fluid from the auxiliary reservoir to the brake cylinder, there being a communication through which fluid may be supplied from the brake pipe to said piston and a communication through which fluid may be vented from said piston to the brake pipe, of a valve mechanism controlling the communication through which fluid is vented from said piston to the brake pipe, and electrically controlled means for effecting the operation of said valve mechanism to close the communication controlled by said valve mechanism.

6. The combination with a brake pipe, an auxiliary reservoir, a brake cylinder, and a triple valve device having a piston subject to the opposing pressures of the brake pipe and auxiliary reservoir and operated upon a reduction in brake pipe pressure for supplying fluid from the auxiliary reservoir to the brake cylinder, said piston controlling a communication through which fluid is supplied from the brake pipe to the auxiliary reservoir, of an electro-pneumatic brake apparatus operated electrically for supplying fluid from the auxiliary reservoir to the brake cylinder, whereby the brake pipe pressure is reduced by flow from the brake pipe through said communication to the auxiliary reservoir, and a valve mechanism operated upon operation of said electro-pneumatic brake apparatus to supply fluid to the brake cylinder for cutting off a communication through which fluid is vented from said piston to the brake pipe.

ELLIS E. HEWITT.